(12) United States Patent
Thelander

(10) Patent No.: US 9,637,876 B2
(45) Date of Patent: May 2, 2017

(54) DEVICE FOR SLANTING FLOORS IN PASSENGER BRIDGES

(71) Applicant: FMT INTERNATIONAL TRADE AB, Trelleborg (SE)

(72) Inventor: Per Thelander, Hollviken (SE)

(73) Assignee: FMT INTERNATIONAL TRADE AB, Trelleborg (SE)

( * ) Notice: Subject to any disclaimer, the term of this patent is extended or adjusted under 35 U.S.C. 154(b) by 183 days.

(21) Appl. No.: 14/405,254

(22) PCT Filed: Mar. 14, 2014

(86) PCT No.: PCT/SE2014/050312
§ 371 (c)(1),
(2) Date: Dec. 3, 2014

(87) PCT Pub. No.: WO2014/209199
PCT Pub. Date: Dec. 31, 2014

(65) Prior Publication Data
US 2016/0265175 A1    Sep. 15, 2016

(30) Foreign Application Priority Data

Jun. 25, 2013  (SE) ..................................... 1350764

(51) Int. Cl.
*E01D 15/00*  (2006.01)
*E01D 15/24*  (2006.01)
(Continued)

(52) U.S. Cl.
CPC .............. *E01D 15/24* (2013.01); *B63B 27/14* (2013.01); *B63B 27/143* (2013.01); *B64F 1/305* (2013.01); *E01D 15/02* (2013.01); *E01D 18/00* (2013.01)

(58) Field of Classification Search
CPC ......... E01D 15/02; E01D 15/24; E01D 18/00; B64F 1/305
(Continued)

(56) References Cited

U.S. PATENT DOCUMENTS

| 4,807,317 A | 2/1989 | Quinn et al. |
| 4,865,312 A | 9/1989 | Katz |

(Continued)

FOREIGN PATENT DOCUMENTS

| WO | 2004/005126 A1 | 1/2004 |
| WO | 2012/108823 A1 | 8/2012 |

OTHER PUBLICATIONS

International Search Report, dated Sep. 12, 2014, from corresponding PCT application.

*Primary Examiner* — Raymond W Addie
(74) *Attorney, Agent, or Firm* — Young & Thompson

(57) ABSTRACT

Device at inclined floors in passenger bridges for connection between a terminal building and a ship or an aircraft, includes two or more consecutive walking tunnels adjustable to be inclined in relation to the horizontal plane, and which include horizontal resting planes, wherein the floor of the walking tunnel extends out from a floor portion constituting the resting plane in opposite directions from the resting plane. A first short end of the respective floor of the walking tunnel is pivotally fixed to the floor portion, constituting the resting plane, the other short end of the respective floor rests on a sliding or rolling surface arranged so that the floor can move lengthwise relative to the sliding or rolling surface. The floor portion forming the resting plane is arranged to be pivoted about a horizontal axis via an electric actuator or hydraulic cylinder, whereby the resting planes assume a horizontal position.

7 Claims, 1 Drawing Sheet

(51) Int. Cl.
*B64F 1/305* (2006.01)
*B63B 27/14* (2006.01)
*E01D 15/02* (2006.01)
*E01D 18/00* (2006.01)

(58) Field of Classification Search
USPC .................................................. 14/71.5, 69.5
See application file for complete search history.

(56) References Cited

U.S. PATENT DOCUMENTS

| | | | |
|---|---|---|---|
| 4,998,313 A | | 3/1991 | Lippka et al. |
| 5,247,899 A | | 9/1993 | Boesser |
| 5,950,266 A | * | 9/1999 | Streeter ................... E01D 15/24 14/69.5 |
| 6,659,704 B2 | * | 12/2003 | Fukuhara .............. B64F 1/3055 14/71.5 |
| 6,668,411 B1 | | 12/2003 | Anderberg |
| 7,069,611 B2 | * | 7/2006 | Larson ...................... B64F 1/30 14/71.1 |
| 7,603,734 B2 | * | 10/2009 | Connelly ................ B64F 1/305 14/69.5 |
| 2003/0140580 A1 | | 7/2003 | Pevar |
| 2016/0083114 A1 | * | 3/2016 | Kim ...................... B64F 1/3055 14/71.5 |
| 2016/0152349 A1 | * | 6/2016 | Larson ................... B64F 1/305 14/2.4 |

* cited by examiner

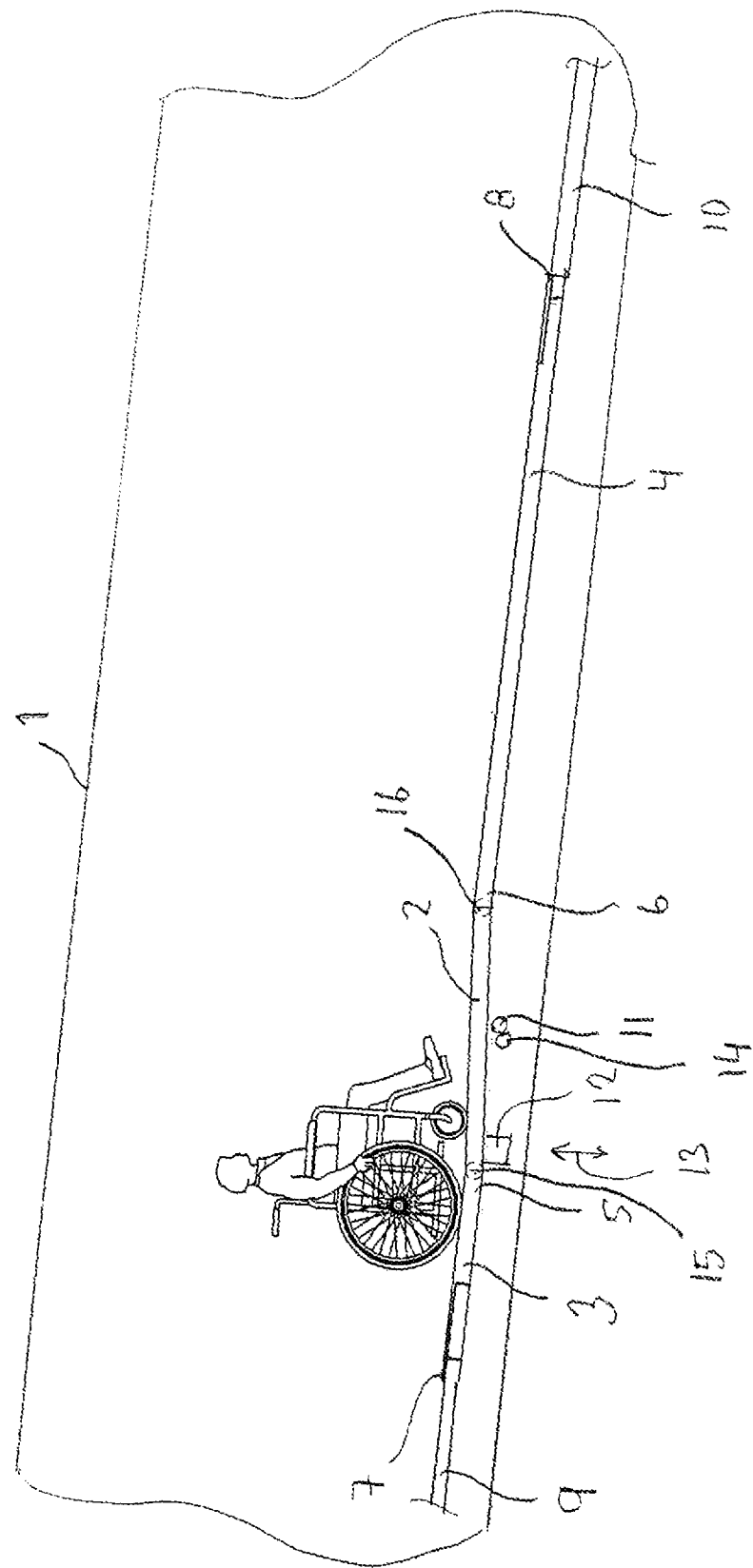

DEVICE FOR SLANTING FLOORS IN PASSENGER BRIDGES

The present invention relates to a device for use at slanting floors in passenger bridges of the type used between a terminal building and an aircraft, or a terminal building and a ship.

Such passenger bridges for ships are provided in order to, with one of its ends, preferably be connected to a terminal building, and is arranged, with its other end, to be connected to a door opening in the hull of a ship.

The passenger bridge comprises several sections of passenger bridges that are connected to each other so that passengers can walk through one section and into another section.

The applicant's own U.S. Pat. No. 6,668,411 discloses a passenger bridge of this type. The passenger bridge according to the US patent comprises an odd number of sections of passenger bridges, however at least three. Between the said sections, shorter passenger bridges run in the form of transitional sections, using which the passengers move from one section of the passenger bridge into another section. The respective heights of the sections are individually adjustable, so that the first end of the passenger bridge can be connected to a terminal building or the like, and so that the other end of the passenger bridge can be connected to a door in the hull of a ship.

Furthermore, the sections are arranged to form an angle to the horizontal plane, in order to compensate for height differences between an entry/exit of a terminal building and said door in the hull of the ship.

Furthermore, the passenger bridge is supported by a frame, said frame supporting the sections and transitional sections. The frame is in turn supported by a number of wheels resting against a quayside where a ship is landed. The passenger bridge is movable in two mutually perpendicular directions, by way of one or more wheels being driven.

At least that section the free end of which is to be connected to a ship may be telescopic along its longitudinal direction.

In the United States, there is something called ADA (Americans with Disabilities Act), arranged to safeguard the rights of the disabled and their abilities to move freely in the community.

ADA stipulates, with respect to inclinations for constructing walkways/tunnels, that the maximum inclination is 1:12 over a maximum distance of 30 feet, in other words 9 meters. The height difference of an inclined plane shall not exceed 760 mm, which results in a maximum length of 30 feet at the inclination 1:12. After an inclined plane, a horizontal resting plane must be arranged, which is at least 60 inches of length, in other words 1.5 meters.

This is not a problem at stationary walkways or tunnels, where resting planes are included.

As regards passenger bridges for ships, such bridges are designed to tilt upwards and downwards in the walking direction, depending on the type of vessel the passenger bridge will be connected to; the water height in relation to the quay; and what floor in a terminal building that the passenger bridge is connected to.

For passenger bridges for ships, the inclination of the passenger bridge's floor will hence vary from situation to situation. This poses a problem, since thereby the vertical angle between the floor of the passenger bridge and the respective resting plane will vary.

A known solution is to provide a separate ramp for the transition between the passenger bridge floor and the resting plane. However, the transition slope will then be greater than 1:12.

The present invention solves this problem.

Hence, the present invention relates to a device at inclined floors in passenger bridges for connection between a terminal building and a ship or an aircraft, comprising two or more consecutive walking tunnels, which walking tunnels are adjustable to be inclined in relation to the horizontal plane, and which walking tunnels comprise horizontal resting planes, wherein the floor of the walking tunnel extends out from a floor portion constituting the said resting plane in opposite directions from the resting plane, and is characterized in that a first short end of the respective floor of the walking tunnel is pivotally fixed to the said floor portion, constituting the said resting plane, in that the other short end of the respective floor rests on a sliding or rolling surface arranged so that the floor can move lengthwise relative to the said sliding or rolling surface, in that the floor portion, which forms the resting plane, is arranged to be pivoted about a horizontal axis by use of an electric actuator or a hydraulic cylinder, using which the resting plane or planes is or are arranged to assume a horizontal position.

Below, the invention is described in closer detail, partly in connection with an embodiment of the invention illustrated in the FIGURE.

The FIGURE schematically shows a cross-section of a device according to the invention.

The FIGURE shows, schematically and in cross-section, a section of a device for use at inclined floors in passenger bridges for connection between a terminal building and a ship or an aircraft, comprising two or more consecutive walking tunnels 1. The walking tunnels 1 are adjustable to be inclined in relation to the horizontal plane. The walking tunnels comprise horizontal resting planes 2, wherein the floor 3, 4 of the walking tunnel extends out from the floor portion 2 which constitutes the said resting plane in opposite directions from the resting plane.

According to the invention, a first short end 5, 6 of the respective floor 3, 4 of the walking tunnel 1 is pivotally fixed, via a suitable hinge 15, 16, to the said floor portion 2, constituting the said resting plane. The other short end 7, 8 of the respective floor rests on a sliding or rolling surface 9, 10, arranged so that the floor can move lengthwise relative to the said sliding or rolling surface. According to one alternative, rolls can be arranged at the said other short end 7, 8 of the respective floor. According to another alternative, rolls can be arranged in the passenger bridges, on which the said other ends of the respective floors roll. Hence, the floor 3, 4 of the said walking tunnel is movable in relation to the walls and the roof of the walking tunnel.

In the FIGURE, only a cross-section of a walking tunnel is shown. A complete walking tunnel can be comprised by a number of floors 3, 4 with a number of intermediate floor sections, constituting resting planes.

Moreover, the floor portion 2, which forms the resting plane, is arranged to be pivoted about a horizontal axis 11, by use of an electric actuator or a hydraulic cylinder 12, using which the resting plane or planes is or are arranged to assume a horizontal position. The actuator or hydraulic cylinder 12 is arranged to move in the direction shown by arrow 13.

An angle sensor 14, of suitable type, is connected to the said axis 11 and arranged to measure the angle of the resting plane in relation to the horizontal plane. Furthermore, the angle sensor is arranged to provide a signal to a not shown, suitable and conventional control circuit, which is arranged to control the said actuator 12 to a position in which the resting plane is horizontal.

The floor section 2 which constitutes the resting plane is at least 5 feet (1.5 meters) of length.

The length of the floor 3, 4 of the walking tunnel, between two consecutive resting planes, is maximally 30 feet (9 meters).

Above, a number of embodiments have been described. However, the details of floors, resting planes, actuators, etc. can be designed in other suitable ways.

Therefore, the invention is not to be considered limited to the above described embodiments, but may be varied within the scope of the enclosed claims.

The invention claimed is:

1. A device with inclined floors in passenger bridges for connection between a terminal building and a ship or an aircraft, comprising two or more consecutive walking tunnels (1), which walking tunnels are adjustable to be inclined in relation to the horizontal plane, and which walking tunnels comprise horizontal resting planes, wherein floor segments (3,4) of the walking tunnel (1) extend out from a floor portion (2) constituting said resting plane in opposite directions from said resting plane, wherein a first short end (5,6) of a respective floor segment (3,4) of the walking tunnel is pivotally fixed, via a hinge (15,16), to said floor portion (2), constituting said resting plane, wherein an opposite short end (7,8) of the respective floor segment (3,4) rests on a sliding or rolling surface (9,10) and is configured so that the respective floor segment can move lengthwise relative to said sliding or rolling surface, wherein the floor portion (2), which forms the resting plane, is configured so as to be pivoted about a horizontal axis (11) by use of an electric actuator (12) or a hydraulic cylinder, whereby the floor portion (2) is adapted to assume a horizontal position.

2. A device according to claim 1, wherein the floor portion (2) which constitutes the resting plane is at least 5 feet (1.5 meter) of length.

3. A device according to claim 1, wherein a length of the floor segments (3,4) of the walking tunnel (1) between two consecutive resting planes is maximally 30 feet (9 meters).

4. A device according to claim 1, wherein an angle sensor (14) is adapted to measure the angle of the resting plane in relation to a horizontal plane, and to provide a signal to a control circuit in turn arranged to control said electric actuator (12) or said hydraulic cylinder to a position in which the resting plane is horizontal.

5. A device according to claim 2, wherein a length of the floor segments (3,4) of the walking tunnel (1) between two consecutive resting planes is maximally 30 feet (9 meters).

6. A device according to claim 2, wherein an angle sensor (14) is adapted to measure the angle of the resting plane in relation to a horizontal plane, and to provide a signal to a control circuit in turn arranged to control said electric actuator (12) or said hydraulic cylinder to a position in which the resting plane is horizontal.

7. A device according to claim 3, wherein an angle sensor (14) is adapted to measure the angle of the resting plane in relation to a horizontal plane, and to provide a signal to a control circuit in turn arranged to control said electric actuator (12) or said hydraulic cylinder to a position in which the resting plane is horizontal.

* * * * *